Nov. 7, 1933.  A. F. HANSON  1,934,424
DISHED ARTILLERY WHEEL STAMPING
Filed May 21, 1932

INVENTOR
ARTHUR F. HANSON.
BY John P. Tarbox
ATTORNEY

Patented Nov. 7, 1933

1,934,424

UNITED STATES PATENT OFFICE 1,934,424

DISHED ARTILLERY WHEEL STAMPING

Arthur F. Hanson, Philadelphia, Pa., assignor to Budd Wheel Company, Philadelphia, Pa., a corporation of Pennsylvania Application May 21, 1932. Serial No. 612,690

8 Claims. (Cl. 219—10)

My invention relates to welding and more particularly to welding wherein complementary members are to be welded together to form an integral unitary structure, and has for its primary object the attainment of good contact between the welding dies and the work parts.

Another feature of the invention is to maintain the members relatively in a condition of body tension, whereby the yieldable resistance to movement of the work piece separators is overcome by the reduced flexure of the work at the time of the approach motion of the dies, thereby accomplishing the previously enumerated and other objects incident thereto.

My invention will be better understood when considered in connection with the accompanying specification, and drawing and will be pointed out in the claims appended hereto. In the accompanying drawing wherein like numerals represent corresponding parts in the various figures.

Figure 1:
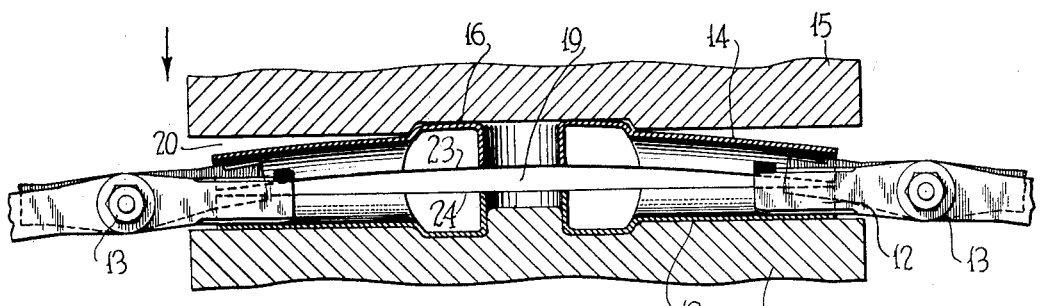
Figure 1 shows work parts positioned interiorly between the dies of the welding machine with the separators positioned between the complementary work parts and retaining them in separated position.

In carrying out the features of my invention I initially flex or dish the members to obtain a relative dishing or spacing therebetween, prior to the welding operation. This may be accomplished by dishing one of the members or both of the members and thereafter positioning them in the machine. As in Figure 1 the lower work piece 10 is placed upon the lower die surface 11 in a suitable matrix formed in the die or electrode face and is retained in good contact therein by means of one part 12 of the separator 13. A plurality of separators are positioned circumferentially of the die, where essentially circular shaped members are to be united, spacing the complementary work parts at a plurality of peripheral points.

After the lower work member 10 has been placed in the die, the separators are brought radially inwardly and the mechanism operated to position them in extended relation somewhat analogously to the operation by a pair of scissors. After this operation the upper complementary member 14 is placed upon the separators. When the member is circular it is dished or flexed substantially conically, i. e. radially inwardly.

Figure 2:
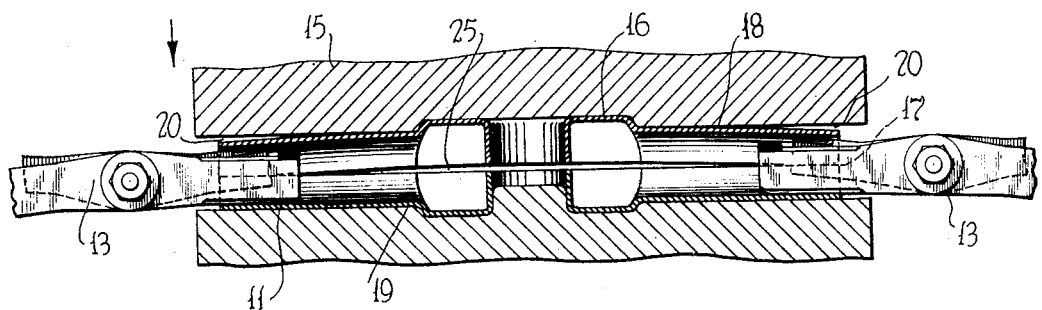
Figure 2 shows the position of the work parts during approach die motion.

The upper die 15 is allowed to approach and a contact at the point 16 between the die and the work part is obtained. The continued approach of the dies effects a condition as pictured in Figure 2 wherein the peripheral extremities of the complementary parts contact as at 17 and the continued approach effects a straightening action between the point 17 as a fulcrum creating a still larger good surface contact as at 16 and 18 of the die surface. The conical space 19 which was initially between the adjacent parts 23 and 24 of the two work members has now been reduced to the substantial frusto-conical space 25 as in Figure 2. At the radially outermost portions of the work members a gap still exists between the upper electrode and the work piece as at 20. The separators have closed together an observable distance as desirable.

Figure 3:
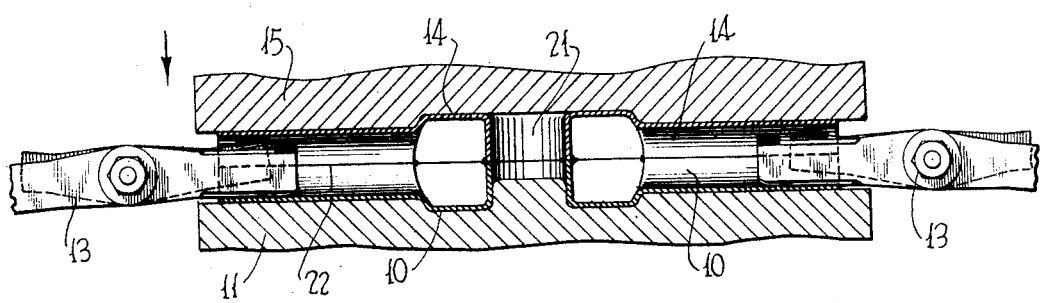
Figure 3 shows the parts in relative position after the welding operation has been performed.

The approach motion continues from this position until, in Figure 3, the welding operation has been completed and the work parts 10 and 14 now form a unitary integral structure in this example comprising a wheel body 21 welded upon a medial plane 22 substantially throughout. In this position the separators 13 have been closed a still greater distance, but as is observable they are still separated a sufficient distance so that they may be effectively removed from position between the now integral work pieces thus allowing the completed article to be removed from the machine.

I attain, by means of the previously described operations, a firm and good surface contact of the work and electrode whereby proper current distribution is obtained with relatively low loss. The flashing operation of the weld initially starts at the periphery and continues inwardly so that the entire complementary substantial co-extensive surfaces previously aligned have been made into a unitary continuous body homogeneously united together.

The operation of my invention is as follows:

The work piece or pieces, preferably the upper one of two complementary members, where a steel artillery type wheel is to be welded, is dished or flexed. A good contact between the die or electrode is obtained and as the two parts are pressed together, the die continues to add contact area between the work, so that as the power increases to complete the weld of the larger area of contacting coextensive surfaces, the current density in the die surface does not increase as the area is continuously enlarged. The upper member fulcrums about its peripheral points of contact and a good weld is created.

My invention as herein disclosed is susceptible of some modifications and is equivalent within the true spirit and scope of my invention I aim to cover by the claims hereto attached and made a part hereto.

What I claim is:

1. The method of flash welding members which comprises flexing one of the members to provide a tapering space therebetween, moving the members relatively to gradually simultaneously close said space and decrease said flexure whereby said tapering space is eliminated while subjecting the members to welding current.

2. Complementary sheet metal spiders adapted to be flash welded having aligned edges to be welded together, said members being relatively flexed centrally of said members.

3. Complementary sheet metal spiders adapted to be flash welded having aligned edges to be welded together, said members being relatively flexed conically radially inwardly thereof.

4. The method of making an artillery type wheel body which comprises forming complementary sheet metal spiders adapted to be welded upon a medial plane, flexing one of said spiders conically radially inwardly thereof, then reducing the space between said bodies while relatively approaching the same and simultaneously flash welding upon said medial plane.

5. The method of welding complementary artillery type wheel spiders which comprises dishing one of said spiders so as to obtain good contact centrally between the die and work parts, allowing said stamping to yield against the die movement and flatten thereagainst, then flashing the edges and butting the parts together.

6. The method of welding complementary wheel spiders which comprises dishing one of said spiders, charging the machine with said dished spider uppermost, approaching the dies so that the central portion of said dished spider contacts with the die, continuing the die approach until the dished spider has flexed and flattened against the die surface, then flashing and butting said spiders together.

7. The method of positioning complementary artillery type wheel spiders in a welding machine which comprises dishing one or both of said spiders, positioning said flexed spiders between the dies in yieldable separated relation and approaching said dies so as to flatten said work parts into good contact with said electrode and under a condition of body tensile stress.

8. The method of welding artillery type complementary spiders which comprises dishing one or both of said spiders, placing said spiders between the dies in spaced relation by means of a plurality of yieldable separators positioned interiorly of the spoke portions, initiating the die movement and flashing, and simultaneously with said flashing and die movement decreasing the flexure of said spiders, whereby to remove the tapering space therebetween and weld the said parts.

ARTHUR F. HANSON.